(12) United States Patent
Partridge et al.

(10) Patent No.: US 6,972,093 B2
(45) Date of Patent: Dec. 6, 2005

(54) ONBOARD FUEL SEPARATION APPARATUS FOR AN AUTOMOBILE

(75) Inventors: Randall D. Partridge, Califon, NJ (US); Walter Weissman, Basking Ridge, NJ (US); Takanori Ueda, Susono (JP); Yoshihiro Iwashita, Susono (JP)

(73) Assignees: Exxonmobil Research and Engineering Company, Annandale, NJ (US); Toyota Jidosha Kabushiki Kaisha, Toyota (JP)

( * ) Notice: Subject to any disclaimer, the term of this patent is extended or adjusted under 35 U.S.C. 154(b) by 170 days.

(21) Appl. No.: 10/248,592

(22) Filed: Jan. 30, 2003

(65) Prior Publication Data

US 2004/0149644 A1    Aug. 5, 2004

(51) Int. Cl.[7] .......................... B01D 63/00; F02N 17/08
(52) U.S. Cl. .................. 210/321.6; 210/634; 210/640; 210/649; 210/605; 210/651; 210/652; 210/653; 210/654; 210/655; 585/818; 585/819; 261/18.3; 261/34.1; 123/179.8; 123/179.9; 123/1 A; 123/3
(58) Field of Search .................. 210/634, 640, 210/649–655, 321.6; 585/818, 819; 261/18.3; 261/34.1; 123/179.7, 179.8, 179.9, 14, 3

(56) References Cited

U.S. PATENT DOCUMENTS

5,095,171 A * 3/1992 Feimer et al. .............. 585/819
2002/0139321 A1  10/2002 Weissman et al. .......... 123/1 A

FOREIGN PATENT DOCUMENTS

JP        A 5-312115    11/1993
JP        A 2000-329013 11/2000

* cited by examiner

Primary Examiner—W. L. Walker
Assistant Examiner—K S Menon
(74) Attorney, Agent, or Firm—Oliff & Berridge, PLC

(57) ABSTRACT

An onboard fuel separation apparatus separates a material fuel (gasoline) into a high-octane fuel having a higher octane value than the material fuel and a low-octane fuel having a lower octane value than the material fuel using a separation membrane which selectively allows high-octane value components (such as aromatic components) permeate through the membrane. The apparatus increases the ratio of the amount of the high-octane value components permeating through the membrane to the amount of the high-octane value components contained in the material fuel by, (A) Controlling the temperature of the material fuel supplied to the membrane (B) Increasing partial pressure of the low-octane value components on the high-octane fuel side of the membrane and removing volatiles from the permeate, and (C) Bypassing volatiles in the material feed around the membrane.

6 Claims, 2 Drawing Sheets

ONBOARD FUEL SEPARATION APPARATUS FOR AN AUTOMOBILE

BACKGROUND OF THE INVENTION

1. Field of the Invention

The invention relates to an onboard fuel separation apparatus for an automobile and, more specifically, to an onboard fuel separation apparatus having a separation membrane that separates a material fuel into a high-octane fuel and a low-octane fuel.

2. Description of Related Art

A fuel separation apparatus using a separation membrane which is capable of separating a fuel supplied to the apparatus (i.e., a fuel used as a material) into fuels having different properties is known in the art.

A fuel separation apparatus of this type is, for example, disclosed in the Japanese Unexamined Patent Publication (Kokai) No. 5-312115. An apparatus of the '115 publication separates gasoline in a gasoline tank into a fuel having a high-boiling point and a fuel having a low-boiling point, by using a pervaporation membrane, and stores the obtained low boiling point fuel in a fuel tank. At the time of a startup or a cold operation of the engine, the apparatus supplies the low-boiling point fuel stored in the fuel tank to the engine. The apparatus of the '115 publication uses the separated low-boiling point fuel for startup and a cold operation of the engine in order to improve the startup engine performance, and the property of the exhaust gas, during the cold operation.

Since the low-boiling point fuel is separated from an ordinary gasoline in the apparatus of the '115 publication, the startup performance and the exhaust gas property of the engine can be improved by using low-boiling point fuel without requiring separate supply of the low-boiling point fuel.

However, although the apparatus of the '115 publication uses the low-boiling point fuel separated from gasoline, the apparatus returns the fuel remaining, after separation of the low-boiling point fuel, to the gasoline tank, and mixes it with the material fuel.

As explained later, the separation membrane used in the '115 publication is a pervaporation membrane which selectively allows high boiling point components to permeate through the membrane. However, the type of membrane employed is not selective to compound types; i.e., aromatics versus linear paraffins. As a result, the octane values of the separated fuels are not largely different from the octane value of the original fuel. In a recent SAE publication 2001-01-1193 a feasibility study is presented on use of a gasoline fractionation system to produce streams differing in combustion properties for use in an automobile. A continuous fractionation system was developed and then operated in conjunction with a bench test engine. The fractionating system generated streams differing some in octane level; however the difference in RON (Research Octane Number) between the high-octane fraction and the original fuel was very limited being only 3.3 numbers (98 RON for the high octane product versus 94.7 RON for the original fuel).

If both a high-octane fuel and low-octane fuel can be produced, it becomes possible to select the octane value of the fuel in accordance with the engine operating conditions. It is particularly desirable to apply this approach with regular grade gasoline of low octane; i.e. <90–92 RON. In this case, however, it is required that the octane value of the high-octane fuel be sufficiently large relative to the original fuel and the volume of this product be in sufficient quantity.

As explained above, it is difficult to achieve a large increase in RON of a high octane product relative to the original fuel in the apparatus in the '115 or in the SAE 2001-01-1193 publications.

SUMMARY OF THE INVENTION

In view of the problems in the related art as set forth above, one of the objects of the present invention is to provide an onboard fuel separation apparatus for an automobile having a high separation efficiency for octane segregation while using a separation membrane so that a sufficient amount of a high-octane fuel having a large difference in octane value relative to the original fuel is obtained.

The object as set forth above is achieved by an onboard fuel separation apparatus for an automobile comprising a separation membrane for separating a fuel supplied as an input material into a high-octane fuel containing a larger amount of high octane value components than the material fuel and a low-octane fuel containing a larger amount of low octane value components than the material fuel by selectively allowing high-octane value components in the material fuel to permeate therethrough and forming a high-octane fuel on one side thereof and a low-octane fuel on the other side thereof and octane value increasing means which, when activated, increases the amount of high-octane value components contained in the high-octane fuel separated by the separation membrane compared with the case where the octane value increasing means is not activated.

According to the present invention, when the octane value increasing means is activated, the amount of the high-octane value components contained in the high-octane fuel increases. Therefore, the octane value of the high-octane fuel becomes higher and the difference between the octane values of the high-octane fuel and the low-octane fuel becomes larger when the octane value increasing means is activated.

The octane value increasing means may include a permeability increasing means to increase the ratio of the amount of high-octane value components permeating through the separation membrane to the amount of the high-octane value components contained in the material fuel compared with the case where the permeability increasing means is not activated.

BRIEF DESCRIPTION OF THE DRAWINGS

The present invention will be better understood from the description, as set forth hereinafter, with reference to the accompanying drawings in which.

DETAILED DESCRIPTION OF THE PREFERRED EMBODIMENT

Hereinafter, embodiments of the onboard fuel separation apparatus for automobile according to the present invention will be explained with reference to FIGS. 1 and 2.

Figure 1:
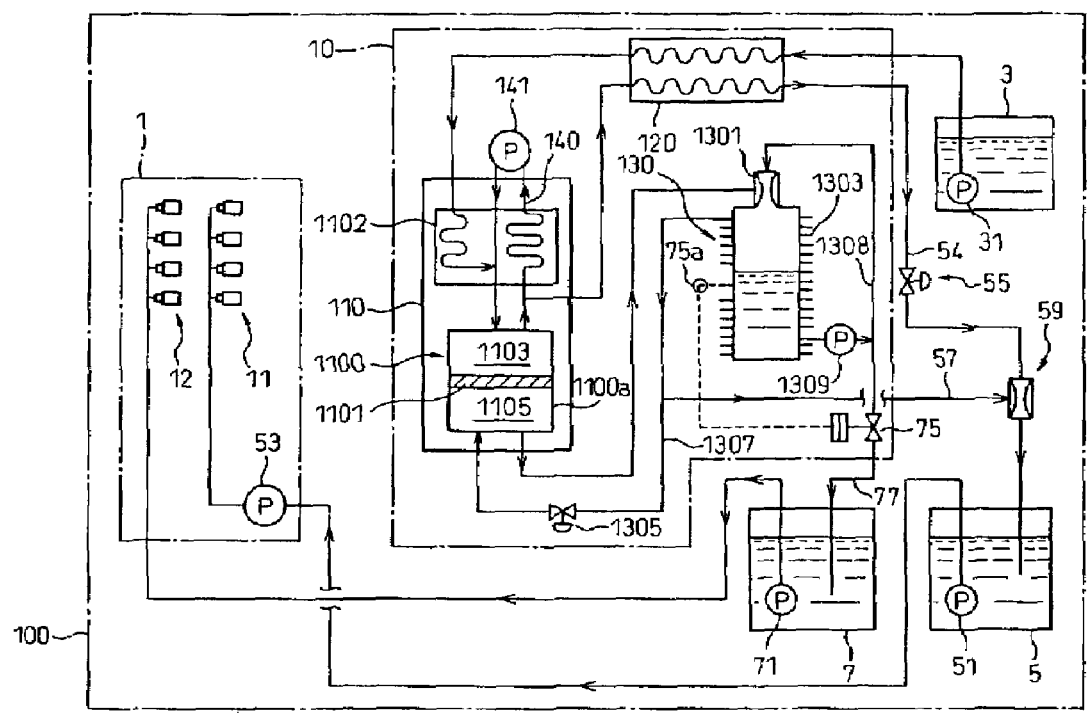
FIG. 1 is a drawing schematically shows the construction of an embodiment of the fuel separation apparatus according to the present invention.

FIG. 1 schematically shows the construction of an embodiment of the onboard fuel separation apparatus according to the present invention.

In FIG. 1, reference numeral 1 designates an automobile internal combustion engine, 11 and 12 collectively designates fuel injection valves of the engine 1. In this embodiment, as explained later, a high-octane fuel having a higher octane value and a low-octane fuel having a lower octane value are used for the engine 1 and two separate fuel injection valves 11 and 12 are disposed on each cylinder of the engine 1 in order to supply the high-octane fuel and low-octane fuel separately to the engine cylinder.

In this embodiment, direct cylinder fuel injection valves are used for the low-octane fuel injection valve 11 for injecting the low-octane fuel directly into the respective cylinders of the engine 1. Further, port injection valves are used for the high-octane fuel injection valves 12 for injecting the high-octane fuel into the intake ports of the respective cylinders.

Figure 2:
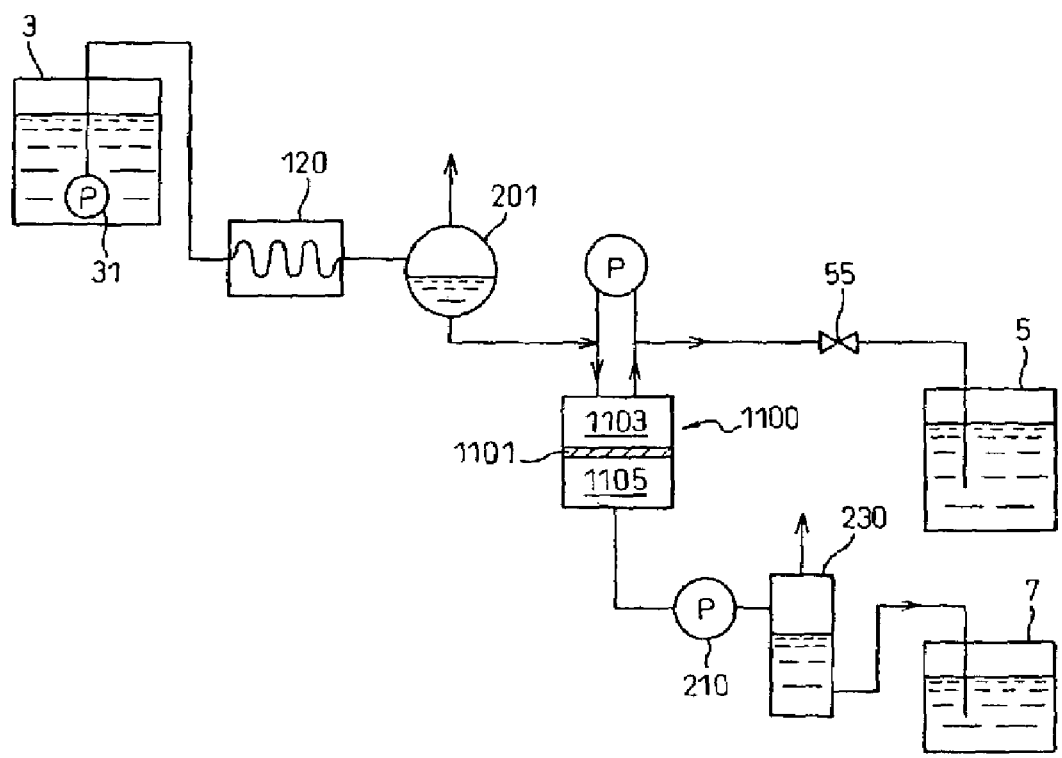
FIG. 2 shows another embodiment of the fuel separation apparatus according to the present invention.

In FIG. 2, numeral 3 designates a fuel tank for storing fuel. A commercially available ordinary gasoline is supplied to the tank 3 and stored therein. Since the fuel in the tank 3 is used as a raw material for producing separated fuels, the fuel in the tank 3 is referred to as "a material fuel" in this specification.

The material fuel in the fuel tank 3 is supplied to a fuel separation apparatus 10 and separated into a high-octane fuel having an octane value higher than the material fuel and a low-octane fuel having an octane value lower than the material fuel. The low-octane fuel and the high-octane fuel separated by the fuel separation apparatus 10 is sent to and stored in a low-octane fuel tank 5 and a high-octane fuel tank 7, respectively.

The fuel separation apparatus 10, the fuel tanks 3, 5, and 7 are all mounted on the body of an automobile 100 together with the engine 1.

The low-octane fuel in the low-octane fuel tank 5 is fed to a high pressure fuel injection pump 53 by a feed pump 51 and supplied to low-octane fuel injection valves 11 after pressurized by the pump 53 and directly injected into the respective cylinders of the engine from the fuel injection valves 11.

The high-octane fuel in the high-octane fuel tank 7 is supplied to the high-octane fuel injection valves 12 by a feed pump 71 and injected into the intake ports of the respective cylinders from the fuel injection valves 12.

Since the separate fuel injection valves 11 and 12 are used for the low-octane fuel and the high-octane fuel, one of the high-octane fuel and the low-octane fuel can be selectively supplied to the engine 1, or both fuels can be supplied to the engine at a predetermined feed ratio in accordance with the engine operating conditions in this embodiment.

In FIG. 1, the fuel separation apparatus 10 separates the material fuel supplied from the fuel tank 3 into the high-octane fuel and the low-octane fuel. The separation apparatus 10 includes a separation unit 110 using a separation membrane that will be explained later, a heat exchanger 120, a vapor-liquid separator 130 and a circulating line 140 with a circulating pump 141.

The separation unit 110 further includes a separation membrane module 1100 and a material fuel heater 102. The separation membrane module 1100 consists of a housing 1100a constructed as a pressure vessel and an aromatic separation membrane 1101 dividing the inside volume of the housing 1100a into two chambers 1103 and 1105.

A membrane having a property that allows selective permeation of aromatic components of the gasoline is used for the membrane 1101. That is, if the material fuel is supplied at a relatively high pressure to one side of the aroma separation membrane 1101 (e.g., the side of the chamber 1103, i.e., a low-octane fuel side of the membrane) and a relatively low pressure is maintained on the other side (e.g., the side of the chamber 1105, i.e., a high-octane fuel side of the membrane), mainly the aromatic components of the material fuel permeate through the separation membrane 1101, and effuses to the low-pressure side surface of the membrane 1101, and covers the membrane surface facing the low-pressure side 1105.

By removing the effused fuel covering the low-pressure side membrane surface, effusion of the aromatic components through the separation membrane 1101 to the low-pressure side continuously occurs. In this embodiment, by keeping the pressure on the low-pressure side (the chamber 1105 side) at a pressure that is lower than the vapor pressure of the effused aromatics (for example, a negative pressure), a large amount of aromatic components are continuously removed from the surface and recovered as a fuel vapor.

The fuel vapor recovered from the low-pressure chamber 105 of the separation membrane module 1100 is sent to the vapor-liquid separator 130 and cooled in there. Thus, aromatic components that have a relatively high boiling point are condensed in the vapor-liquid separator 130 and a liquid high-octane fuel containing a larger amount of aromatic components is formed at the bottom of the vapor-liquid separator 130. The vapor leaving the separator is a low boiling material of lower octane than the liquid separator bottoms. This can be combined with the low octane product from the membrane or retained as a separate fuel stream for use in startup. In cold weather, because of its high volatility, this low boiling material would offer advantages as a startup fuel.

As is well known in the art, if the amount of aromatic components in gasoline increases, the octane value of gasoline (research octane number, sometimes abbreviated as "RON") increases. Therefore, a separated fuel recovered from the vapor-liquid separator 130 which contains a larger amount of aromatic components has an octane value significantly higher than that of the material fuel. The fuel remained in the high-pressure chamber 1103 of the separation membrane module 1100 from which some of the aromatic components removed and contains a smaller amount of aromatic components is recovered as a low-octane fuel having an octane value smaller than that of the material fuel.

That is, if the material fuel is supplied to the high-pressure side chamber 1103 of the separation membrane module 1100, a high-octane fuel having a higher octane value than the material fuel is recovered from the low-pressure side chamber 1105 as a fuel vapor which is subsequently further enriched in aromatics and enhanced in octane by separating out a liquid portion in separator 130 and a low-octane fuel having a lower octane value than the material fuel is recovered from the high-pressure side chamber 1105 as such or after combination with the separator 130 overhead Thus, the material fuel is separated into the high-octane fuel and the low-octane fuel by the separation apparatus 10.

In this embodiment, the high-octane fuel and the low-octane fuel are produced from the material fuel by the onboard fuel separating apparatus 10 and stored in the separated fuel tanks 5 and 7. By using one of the high-octane fuel and low-octane fuel (or by using both high-octane fuel and low-octane fuel at a predetermined ratio) in accordance with the engine operating conditions, the engine performance and the property of the exhaust gas is improved.

The low-octane fuel is very good in ignition quality, as is the separator 130 overhead. Therefore, the use of either of these fuels at the time of startup of the engine or cold operation thereof, for example, achieves an improved performance of the engine and an improved property of the exhaust. On the other hand, a high-octane fuel does not readily undergo self-ignition. Therefore, by using the high-octane fuel in a high-output operation of the engine, the ignition timing of the engine can be largely advanced, and thereby the output of the engine can be increased.

In order to use the high-octane fuel and the low-octane fuel in accordance with the engine operating condition as explained above, it is preferable that the difference between the octane values of the high-octane fuel and the low-octane fuel is as large as possible, and the amount of the high-octane fuel be at least 15% of the material fuel and at least 7 RON octane numbers greater than the material fuel.

However, in general, in processing a typical full boiling range market gasoline the separation efficiency of the separation membrane 1101 alone is not sufficiently high and the required octane values and the amount of the separated fuels are not achieved if only the separation membrane 1101 is used. This is especially a problem with winter grade fuels due to their high content of volatiles, since low boiling non aromatic molecules tend to permeate preferentially due to their high vapor pressure diluting the permeate product aromatics content.

However, the separation efficiency of the separation membrane changes in accordance with the operating conditions of the membrane.

Therefore, in this embodiment, the separation efficiency of the separation membrane 1101 is improved by controlling the operating conditions of the separation membrane in the following manner.

(1) Adjusting the temperature of the material fuel supplied to the separation membrane to an optimum level.

(2) Increasing the partial pressure of the low octane value low boiling components in the low-pressure chamber of the separation membrane module and.

(3) Bypassing low boiling components in the material fuel around the module.

The respective controls of the operating conditions will be now explained.

(1) Adjusting the temperature of the material fuel supplied to the separation membrane to an optimum level.

The ratio of the amount of the aromatic components permeating through the separation membrane to the amount of the aromatic components contained in the material fuel (a permeability ratio) increases as the temperature of the material fuel increases from room temperature until the temperature on the low-pressure side (the chamber 1105 side) reaches a certain minimum limit temperature. This minimum temperature is a function of the pressure level on the low-pressure side, being, for example about 80° C. for a pressure of 5 Kpa. This value for this minimum will depend on the composition of the fuel and the permeate yield target. The critical factor is insuring that the vapor pressure of the highest boiling aromatic to be permeated in high quantity is significantly greater than the pressure on the low-pressure side. When the temperature exceeds this minimum, the permeability ratio will at some point decreases. Thus there is an optimum range to maintain this temperature at; e.g., 75 to 125° C. for pressure of 5 to 20 Kpa. Therefore, it is necessary to control the temperature of the material fuel to maintain the temperature at the low-pressure side in an optimum range in order to achieve the maximum difference in the octane values of the separated fuels and the maximum production amounts thereof.

In this embodiment, the material fuel is heated by a heat exchanger 120 and a heater 1102 before it is fed to the separation membrane module 1100 in order to keep the temperature of the material fuel in the high-pressure chamber 1103 at a temperature where the maximum separation efficiency of the separation membrane is obtained.

The heat exchanger 120, which may be a conventional shell and tube type or a plate type heat exchanger, heats the material fuel in the material fuel supply line 33 from the fuel tank 3 to the separating unit 110 using the heat of the low-octane fuel in the recovery line 54 from the separation unit 110 to the low-octane fuel tank 4.

Since the temperature of the low-octane fuel at the outlet of the separation unit 110 is about 75° C. and much higher than the boiling point of the low-octane fuel, it is preferable to lower the temperature of the low-octane fuel before it is stored in the low-octane fuel tank 7. Therefore, by transferring the heat of the recovered low-octane fuel to the material fuel using the heat exchanger 120, it becomes possible to reduce the energy required for heating the material fuel while cooling the low-octane fuel.

In this embodiment, a heater 1102, such as electric heater or a burner type heater, is disposed in the separation unit 110 in addition to the heat exchanger 120 in order to maintain the temperature of the fuel circulating in the circulating line 140 at a temperature where the permeability ratio of the aromatic components through the separation membrane 1101 becomes the maximum value.

It is preferable to perform a heat exchange between the low-octane fuel and the material fuel at the portion where the temperature of the low-octane fuel becomes the highest. Therefore, it is preferable to dispose the heat exchanger 120 as near as possible to the separation unit 110 so that the low-octane fuel arrives at the heat exchanger 120 before the temperature drop thereof due to the heat radiation through the pipe wall occurs and that the material fuel heated by the heat exchanger 120 arrives at the separation unit 110 before the temperature drop thereof due to the heat radiation through the pipe wall occurs.

As explained above, the separation efficiency of the separation membrane is largely increased by increasing the temperature of the material fuel to an optimum value using the heat exchanger 120 and the heater 1102.

As shown in FIG. 1, the material fuel is supplied from the material fuel tank 3 to the circulating line 140 of the separation unit 110 via the heat exchanger 120 by means of the material fuel feed pump 31. In the circulating line 140, the material fuel is supplied to the high-pressure chamber 1103. The material fuel after contacting the membrane 1101, i.e., the low-octane fuel flows through the circulating line 140 and supplied to the high-pressure chamber 1103. This serves as a convenient, optional means for providing additional heat to the membrane to provide the heat for vaporizing permeate to control low-pressure side temperature and increase the total yield of permeate, albeit with some debit in aromatic permeability ratio due to dilution of the membrane input aromatics concentration.

A control valve 55 is disposed on the recovery line 54 in order to adjust the flow of the fuel in the circulating line 140 and the flow rate and the pressure of the material fuel supplied to the separation unit 110 for temperature control. For example, when the degree of opening of the control valve 55 increases, the flow rate of the low-octane fuel flowing from the circulating line 140 to the low-octane fuel tank 5 increases and the pressure in the high-pressure chamber 1103 of the separation membrane module 1100 decreases accordingly. Further, since the amount of the material fuel flowing into the circulating line 140 is the same as the amount of the low-octane fuel leaving the circulating line 140, the flow rate of the material fuel supplied to the separation unit 110 increases when the degree of opening of the control valve 55 increases.

Since the pressure of the fuel in the circulating line 140 is determined by the discharge pressure of the material fuel feed pump 31, the circulating pump 141 generates a head only required for circulating the fuel in the circulating line 140.

(2) Increasing the partial pressure of the low octane value components in the low-pressure chamber of the separation membrane module.

As explained before, the fuel permeating through the separation membrane 1101 is recovered from the low-pressure chamber 1105 of the separation membrane module 1100 as fuel vapor. However, since the selectivity of aromatic components versus low boiling nonaromatics is typically not high, a relatively large amount of fuel components other than aromatic components (i.e., low-octane value components) permeate through the separation membrane together with aromatic components.

The fuel permeated through the separation membrane 1101 covers the low-pressure chamber side surface of the membrane 1101. By evaporating and removing the liquid fuel covering the low-pressure chamber side membrane surface, effusion of the aromatic components through the aromatic separation membrane 1101 to the low-pressure chamber side continuously occurs.

The rate of evaporation of the low-octane value components in the liquid fuel covering the low-pressure chamber side of the membrane decreases as the partial pressure of the low-octane value components in the low-pressure chamber 1105 increases. Therefore, when the concentration of the low-octane value components in the low-pressure chamber 1105 increases, the evaporation of the low-octane value components in the fuel covering the membrane surface is suppressed and the concentration of the low-octane value components in the liquid fuel covering the surface of the membrane becomes higher.

This causes a decrease in the amount of the low-octane value components permeating through the membrane. On the other hand, if the partial pressure of the aromatic components (high-octane value components) in the low-pressure chamber 1105 is reduced, the amount of the high-octane value components permeating through the membrane increases.

Therefore, when the partial pressure of the low-octane value components in the low-pressure chamber 1105 is increased, the amount of the low-octane value components permeating through the membrane decreases while the amount of the high-octane value components permeating through the membrane increases, and thereby the selectivity of the aromatic components of the separation membrane 1101 becomes higher.

In this embodiment, the selectivity of aromatic components of the membrane is improved by feeding low-octane value components vapor to the low-pressure chamber 1105 of the separation membrane module 1100.

In FIG. 1, the fuel vapor (a mixture of the high-octane value components vapor and low-octane value components vapor) in the low-pressure chamber 1105 is drawn into the vapor-liquid separator 130 by a jet-pump 1301 as explained later and, the pressure in the low-pressure chamber 1105 is maintained at a low value around 50 Kpa.

The vapor-liquid separator 130 is provided with an air-cooling system such as cooling fins 1303 and/or a water-cooling system (not shown) in order to cool the fuel vapor mixture extracted from the low-pressure chamber 1105 so that aromatic components in the fuel vapor mixture condense in the vapor-liquid separator 130. The pressure and the temperature in the vapor-liquid separator 130 are selected in such a manner that most of aromatic components in the vapor mixture condense while other components (low-octane value components) maintaining their gaseous phases. Thus, the vapor mixture extracted from the low-pressure chamber 1105 is separated into a high-octane fuel liquid and a low-octane fuel gas in the vapor-liquid separator 130.

In this embodiment, a fuel vapor circulating line 1307 connects the vapor-liquid separator 130 and the low-pressure chamber 1105 of the separation membrane module 1100 in order to feed a low-octane fuel vapor in the vapor-liquid separator 130 to the low-pressure chamber 1105.

The pressure in the low-pressure chamber 1105 is maintained at a relatively low pressure while the vapor-liquid separator 130 must be kept at a relatively high pressure. A flow control valve 1305 is disposed on the vapor circulating line 1307 so that the pressure difference between the vapor-liquid separator 130 and the low-pressure chamber 1105 is maintained at an appropriate value by controlling the flow rate of the vapor in the vapor circulating line 1307.

Thus, the high-octane value components in the fuel vapor mixture in the low-pressure chamber 1105 is recovered from the vapor-liquid separator 130 in the form of liquid high-octane fuel, and a portion of low-octane value components in the fuel vapor mixture is circulated into the low-pressure chamber 1105 in the form of vapor.

By supplying low-octane fuel vapor to the low-pressure chamber 1105, the partial pressure of low-octane value components in the low-pressure chamber 1105 can be increased while the partial pressure of the high-octane value components (aromatic components) is kept at low.

In FIG. 1, the vapor-liquid separator 130 is further provided with a liquid high-octane fuel circulating line 1308 with a circulating pump 1309 and a high-octane fuel recovery line 77 connecting the liquid high-octane fuel circulating line 1308 to the high-octane fuel tank 7. A level control valve 75 is disposed on the high-octane fuel recovery line 77.

The liquid high-octane fuel in the vapor-liquid separator 130 circulates through the circulating line 1308 by the circulating pump 1309 and is returned to the vapor-liquid separator 130 through the jet pump 1301 disposed on the upper part of the separator 130.

The jet pump 1301 has a function similar to that of an ejector and extracts the fuel vapor mixture in the low-pressure chamber 1105 of the separation membrane module 1100 into the vapor-liquid separator 130 using a vacuum generated by the liquid high-octane fuel passing through a nozzle portion (not shown) in the jet pump 1301.

Since a jet pump has a thermal efficiency higher than a conventional mechanical vacuum pump, only the jet pump 1301 is used for keeping the low-pressure chamber 1105 at a predetermined low pressure in this embodiment. However, a mechanical vacuum pump may be used in lieu of, or in addition to the jet pump 1301 to keep the low-pressure chamber 1105 at a low pressure.

The level control valve 75 controls the level of the liquid high-octane fuel in the vapor-liquid separator 130 to a predetermined range. In this embodiment, a level sensor 75*a* for sensing the liquid level in the vapor-liquid separator 130 is provided. The level control valve 75 opens when the liquid level in the separator rises to a predetermined high level so that the liquid high-octane fuel discharged from the circulating pump 1309 flows into the high-octane fuel tank 7 through the recovery line 77. Thus, the liquid high-octane fuel condensed in the vapor-liquid separator 130 is transferred to the fuel tank 7.

On the other hand, when the liquid level in the vapor-liquid separator 130 decreases to a predetermined low level, the level control valve 75 is closed and liquid high-octane fuel discharged from the circulating pump 1309 starts to circulates again through the circulating line 1308 and the jet pump 1301.

In the present embodiment, since the low-octane fuel vapor separated by the vapor-liquid separator 130 is circulated to the low-pressure chamber 1105 of the separation membrane module 1100, the low-octane fuel vapor is accumulated in the system. This causes the pressure in the vapor-liquid separator 130 to increase.

In order to prevent the pressure rise in the vapor-liquid separator 130, a low-octane fuel vapor recovery line 57 that connects the low-octane fuel vapor circulating line 1307 and the low-octane fuel tank 5.

The low-octane fuel vapor recovery line 57 is connected to a suction port of a jet pump 59 similar to the jet pump 1301 and disposed on the liquid low-octane fuel recovery line 54 at downstream of the control valve 55. Therefore, when the control valve 55 opens and liquid low-octane fuel flows through the jet pump 59, the low-octane fuel vapor in the vapor-liquid separator 130 is extracted through the circulating line 1307 to the jet pump 59, and flows into the low-octane fuel tank 5 after it mixes with the liquid low-octane fuel in the jet pump 59.

Thus, the low-octane fuel vapor in the vapor-liquid separator 130 is transferred to the tank 5 and the pressure in the separator 130 is maintained within an appropriate range.

3) Next, another embodiment of the onboard fuel separation apparatus will be explained with reference to FIG. 2.

In this embodiment, the material fuel is treated before it is supplied to the separation unit so that the concentration of high-octane value component in the material fuel is increased by removing a portion of low-octane value components from the material fuel.

In FIG. 2, reference numerals the same as those in FIG. 1 designate similar elements.

The fuel separation apparatus 10 in FIG. 2, similarly to that in FIG. 1, includes a separation membrane module 1100 and a circulating line 140. However, the material fuel is heated to about 115° C. by a heater (or a heat exchanger which transfers the heat of the separated low-octane fuel to the material fuel) and supplied to a flash drum 201 before it is fed to the separation membrane module 1100.

By heating the material fuel to the temperature about 115° C., low-octane value low boiling components in the material fuel evaporate in the flash drum 201 while high-octane value components are largely maintained in the liquid phase. Therefore, the concentration of the low-octane value components in the material fuel decreases by treating it by the flash drum 201. In other words, the concentration of the high-octane value components in the material fuel increases by treating the material fuel using the flash drum 201.

By supplying the material fuel treated by the flash drum and having higher concentration of high-octane value components to the separation membrane module 1100, the amount of the high-octane value components permeating through the separation membrane 1101 increases compared with the case where the material fuel without being treated by the flash drum 201 is supplied to the separation membrane module 1100.

In this embodiment, the high-octane value components vapor is recovered from the low-pressure chamber 1105 of the separation membrane module 1100 by a mechanical vacuum pump 210 and fed to a vapor-liquid separator 230 similar to the separator 130 in FIG. 1. In the vapor-liquid separator 230, the high-octane fuel is condensed and recovered to the high-octane fuel tank 7.

Although it is not shown in the drawing, the low-octane value components vapor generated in the flash drum 201 and the vapor-liquid separator 230 are recovered and transferred to the low-octane fuel tank 5 in a manner similar to that in FIG. 1. Alternatively this stream can be stored separately and used as a startup fuel. In cold weather, because of its high volatility this low boiling material would offer advantages as a startup fuel.

According to the embodiments explained above, the difference between the octane values of the separated fuels and the production amounts thereof can be remarkably increased in the fuel separation apparatus using separation membrane.

What is claimed is:

1. An onboard fuel separation apparatus for an automobile comprising:

a separation membrane for separating a fuel supplied as a material into a high-octane fuel containing a larger amount of high octane value components than a material fuel and a low-octane fuel containing a larger amount of low octane value components than the material fuel by selectively allowing high-octane value components in the material fuel to permeate therethrough and forming a high-octane fuel on one side thereof and a low-octane fuel on the other side thereof; and a permeability increaser that increases the ratio of the amount of high-octane value components that permeate through the separation membrane to the amount of the high-octane value components contained in the fuel by regulating the temperature of the fuel supplied to the separation membrane, wherein the permeability increaser comprises a vapor-liquid separator which recovers liquid high-octane fuel by cooling the fuel vapor supplied from the high-octane fuel side of the separation membrane and, wherein the permeability increaser further comprises a vapor circulator which increases the partial pressure of the low-octane value components on the high-octane fuel side of the separation membrane by returning the vapor in the vapor-liquid separator remained after the liquid high-octane fuel has been recovered to the high-octane fuel side of the separation membrane.

2. An onboard fuel separation apparatus for an automobile comprising:

a separation membrane for separating a fuel supplied as a material into a high-octane fuel containing a larger amount of high octane value components than a material fuel and a low-octane fuel containing a larger amount of low octane value components than the material fuel by selectively allowing high-octane value components in the material fuel to permeate therethrough and forming a high-octane fuel on one side thereof and a low-octane fuel on the other side thereof; and a permeability increaser that increases the ratio of the amount of high-octane value components that permeate through the separation membrane to the amount of the high-octane value components contained in the fuel by regulating the temperature of the fuel supplied to the separation membrane, wherein the permeability increaser further comprises a permeability ratio increaser which increases the ratio of the amount of high-octane value components that permeate through the separation membrane to the amount of the high-octane value components contained in the material fuel by increasing the concentration of the high-octane value components in the material fuel before it is supplied to the separation membrane.

3. An onboard fuel separation apparatus for an automobile as set forth in claim 2, wherein the permeability ratio increaser increases the concentration of the high-octane value components in the material fuel before it is supplied to the separation membrane by evaporating the low-octane value components from the material fuel.

4. An onboard fuel separation apparatus for an automobile as set forth in claim 2, wherein the permeability increaser comprises a partial pressure increaser that increases the ratio of the amount of high-octane value components permeating through the separation membrane to the amount of the high-octane value components contained in the material fuel by increasing the partial pressure of the low-octane value components on the high-octane fuel side of the separation membrane.

5. An onboard fuel separation apparatus for an automobile as set forth in claim 1 wherein said permeate temperature ranges from about 80 degrees to about 125 degrees C.

6. An onboard fuel separation apparatus for an automobile as set forth in claim 2 wherein said permeate temperature ranges from about 80 degrees to about 125 degrees C.

* * * * *